R. W. RAY.
OIL BOLT.
APPLICATION FILED NOV. 4, 1916.
1,268,999. Patented June 11, 1918.
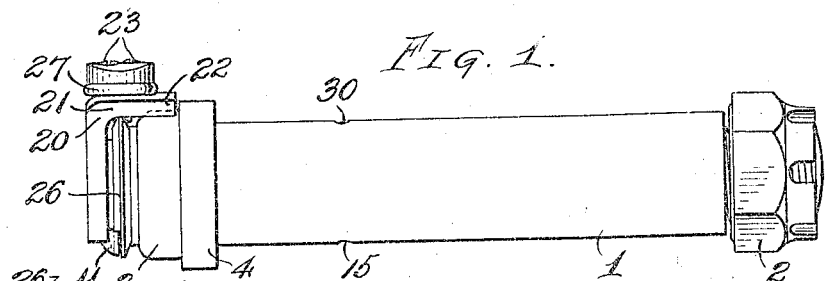
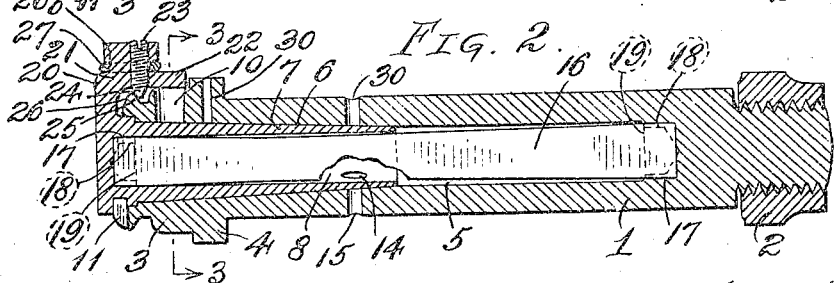
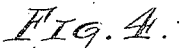
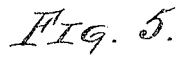
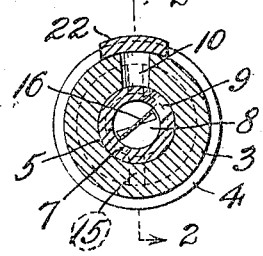
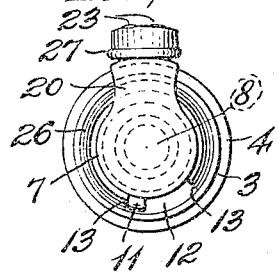
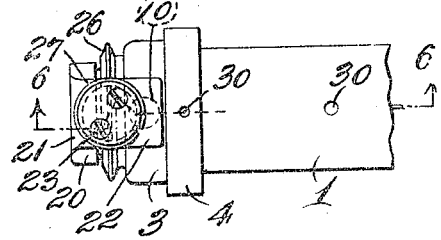
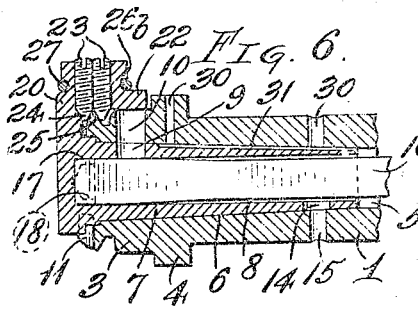
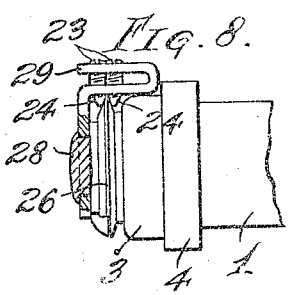
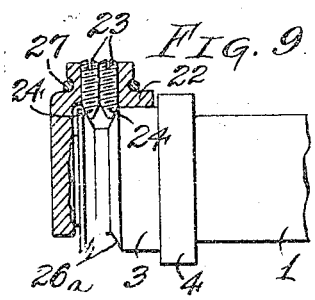
Inventor
Rudolph W. Ray
By Brockett and Hyde
Attys

UNITED STATES PATENT OFFICE.

RUDOLPH W. RAY, OF CLEVELAND, OHIO, ASSIGNOR, BY DIRECT AND MESNE ASSIGNMENTS, OF FIVE-TENTHS TO ALBERT D. RAY, FOUR-TENTHS TO WORTHINGTON HOYT, AND ONE-TENTH TO BLUFORD W. BROCKETT AND ELBERT L. HYDE, ALL OF CLEVELAND, OHIO.

OIL-BOLT.

1,268,999.  Specification of Letters Patent.  Patented June 11, 1918.

Application filed November 4, 1916. Serial No. 129,511.

*To all whom it may concern:*

Be it known that I, RUDOLPH W. RAY, citizen of the United States, residing at Cleveland, in the county of Cuyahoga and State of Ohio, have invented certain new and useful Improvements in Oil-Bolts, of which the following is a specification.

This invention relates to oil bolts or pins or, in other words, bolts or pins having means for lubricating the parts to which they are connected.

The object of the invention is to provide an improved oil bolt or pin having a reservoir for lubricant and provided with the necessary means for causing or permitting flow of said lubricant to the parts to be lubricated. A further object of the invention is to provide an oil bolt which is of simple construction and can be made at low cost and in various sizes and styles; which carries sufficient lubricant for a considerable time; which protects the lubricant against contamination by dirt or foreign substances; which delivers the lubricant directly to the points where lubrication is necessary; which prevents waste by stopping the flow of lubricant except when desired; which can be readily operated whenever desired, to cause or permit flow of lubricant to the parts; which can be substituted for any other ordinary bolt of like size now in use without modification or change of existing parts; and whose lubricating features do not interfere in any way with the ordinary holding functions of the bolt.

Further objects of the invention are in part obvious and in part will appear more in detail hereinafter.

In the drawings, Figure 1 represents an elevation of one form of bolt embodying the invention; Fig. 2 is a longitudinal section on the line 2—2, Fig. 3; Fig. 3 is a cross section on the line 3—3, Fig. 2; Fig. 4 is an end view; Fig. 5 is a plan view of the left hand end of the bolt; Fig. 6 is a detail section on the line 6—6, Fig. 5; Fig. 7 is a plan view showing a modification; Fig. 8 is an elevation thereof, partly in section; and Fig. 9 is a sectional view showing still another modification.

The bolt shown in the drawings comprises a body or shank 1 threaded at one end to receive the nut 2 and provided at the other end with a head 3 forming a shoulder 4. The parts to be held together by the bolt are located between the shoulder 4 and nut 2, the bolt shank having a smooth uninterrupted surface to form a good bearing for any turning parts to which it is connected.

Within the bolt shank is a cavity or chamber 5 closed at the thread end and opening outwardly through the head end of the bolt. This cavity serves as a reservoir for the lubricant which is in liquid form, such as an oil. The outer portion of the cavity has its wall surface tapered or conical, as at 6, to form a seat for a rotatable valve plug 7 which is also provided with a hollow bore or cavity 8 closed at the outer or head end of the valve and open at its inner end, and which supplements the capacity of the chamber in the bolt as an oil reservoir. In the wall of valve 7 is a port or opening 9 extending substantially radially outwardly and at its outer end terminating opposite the inner tapered wall surface 6 of the bolt chamber. By rotating the valve plug on its seat this port can be brought into registration with a radially extending port 10 in the bolt head, which then serves as a filling opening through which oil may be introduced, or as an air hole to permit flow of the lubricant, as will later appear. The plug may also be turned to another position in which the port 9 is opposite a blank portion of the bolt wall, which closes said port and prevents any passage therethrough of oil or air or the entrance of dirt or foreign substances.

Suitable means is provided for limiting rotating movement of the valve plug in both directions. The means shown comprises a pin or projection 11 on the valve plug working in a circumferentially extending slot or recess 12 in the bolt head, the shoulders 13 at the ends of said recess serving as abutments for coöperation with said projection. When the pin contacts with one abutment the valve is open and when it contacts with the other the valve is closed, as will be readily understood.

The bolt shown in the drawings has its valve plug extending about half way into the bolt chamber, the remaining portion of said chamber being cylindrical. The valve plug however, may be of any suitable length, as desired. At one or more points in its length the valve is provided with a port 14 extending through its wall and movable into and out of registration with a coöperative oiling port 15 in the bolt wall. This oiling port opens and closes with the filling and air port 9. Assuming that the chamber contains oil, if the valve is rotated to open position air can flow into the oil chamber through the port 9 and oil will therefore flow out of the oil port directly to the outer cylindrical surface of the bolt shank where lubrication is required. When the valve is closed not only is the oil port 14 closed but the port 9 is also sealed so that no air can pass therethrough. This is an additional safeguard to prevent flow of oil except when desired.

While the valve may be so mounted as to remain stationary in either of its open and closed positions suitable means is preferably provided for normally holding it yieldingly in closed position. This prevents dust and dirt reaching the inner parts of the bolt and possible waste of lubricant. It also enables the valve to be snapped open by a quick finger movement and then allowed to close, thereby permitting only a small quantity of oil to escape to the bearing. For this purpose the valve and bolt body are connected by a spring shown as formed of a resilient thin metal plate or strip 16 lying in the cavities 5 and 8, and whose end portions enter transversely extending notches or recesses 17 in the ends of said cavities. This plate or strip is twisted when the valve is rotated in the bolt and by its torsional action returns the valve from open to closed position. The recesses 17 may be formed by producing a short bore 18 of reduced diameter at the end of the cavity and forcing a nicking tool of full diameter into the shoulder 19 thus produced. Preferably the recesses 17 in the valve are in a plane through the port 9 so that the oil will flow on both sides of the spring strip.

The bolt is also provided with means for adjusting the valve longitudinally to secure a close fitting relation with its seat, but yet prevent binding action. For this purpose the valve head or end portion is provided with a lateral extension 20 having an ear 21 at one side of the bolt head. The end of said ear, marked 22, serves as a stopper or cover for the filling port 10, covering and uncovering the same as the valve is rotated to closed or open position, and prevents said port from becoming clogged with foreign substances. In the extension 20 are two adjusting screws 23, spaced slightly from each other longitudinally of the bolt and having conical inner ends 24 which coöperate with annular inclined surfaces 25 on the bolt head. These inclined surfaces may be the side surfaces of an annular rib 26, as in Fig. 1, or may be the side walls of an annular V-shaped groove 26ª as in Fig. 9. In either case adjustment of one screw against its inclined surface moves the valve inwardly, while the other screw moves it outwardly. By properly adjusting both screws the valve may be tightly seated without binding and may be freely rotated, but nevertheless will have no end play. To hold said screws in adjusted position the side walls of the extension 20 are notched or recessed, as at 26ᵇ, to receive a small spring ring 27 which presses lightly against the sides of the two screws exposed in the recess.

Figs. 7 and 8 show another form of the invention in which the lateral extension before referred to is a part of a metal plate secured to the valve member by casting an integral rivet 28 through a hole in said plate, said plate being bent at the side of the bolt head into two plies parallel with each other but spaced apart. The outer ply 29 is slitted to form two separate screw receiving ears. The holes for the two screws are just bored and tapped through the two plies, after which the plies are pressed slightly toward each other, throwing the threads therein out of true tracking relation. This serves as a lock to prevent the screws from turning freely or escaping.

To further safeguard the device and insure an air supply thereto the wall of the bolt, opposite the valve body may be provided with one or more ports 30 (two being shown) which, when the valve is open are opposite a flattened portion 31 of the valve and along which air can flow from said ports to the oil reservoir.

The bolt described is of simple construction and can of course be made in a wide variety of sizes and shapes. It is suitable for many purposes and can be substituted for any ordinary bolt requiring lubrication without change in the parts to which said bolt is connected. It can also be used in different positions. In its horizontal position, as shown in the drawings, it is adapted for use, for example, on automobile springs as a substitute for the usual eye bolt connecting the end of the spring to its mate or to the vehicle body. In its vertical position it can be used for the pivot bolt connecting the wheel knuckle to the axle. In either position momentary opening of the valve allows a drop or more of oil to flow directly to the parts to be lubricated.

What I claim is:—

1. As an article of manufacture, a self contained oil bolt comprising a bolt body having a head and shank provided with an oil cavity forming an oil reservoir and a port leading from said reservoir to the bolt surface, and a valve member carried by said bolt body and having two positions, in one of which said port is closed and in the other of which said port is opened and permits oil to flow to the bolt surface.

2. As an article of manufacture, a self contained oil bolt comprising a bolt body having a head and shank and provided with an inner cavity forming an oil reservoir and with a port leading from said cavity to the bolt surface, and a valve member rotatable within said cavity and having an extension outside of the same, said extension and the valve member in one of the positions of said member closing both ends of said port, and in another position of said member opening both ends of said port to permit oil to flow to the bolt surface.

3. As an article of manufacture, a self contained oil bolt, comprising a bolt body having a head and shank and provided with an inner cavity forming an oil reservoir, said head and shank being each provided with a radial port, a rotatable valve member in said cavity adapted to open and close both of said ports, and an extension on said valve member lying outside of said valve body and adapted to cover and uncover the outer end of the port in the bolt head.

4. An oil bolt, comprising a bolt body provided with a cavity having a valve seat, a valve turning on said seat, the bolt body having annular inclined surfaces, and adjusting screws carried by said valve and coöperating with said surfaces.

5. An oil bolt, comprising a bolt body provided with a cavity having a valve seat, a valve turning on said seat, the bolt body having annular inclined surfaces, adjusting screws carried by said valve and coöperating with said surfaces, and means for locking said screws in adjusted position.

6. As an article of manufacture, a self contained oil bolt, comprising a bolt body having a head and shank and provided with an inner cavity forming an oil reservoir, the outer end of said cavity having a conical portion forming a valve seat, and said bolt body having a radially extending port opening through said seat, and a tapered valve member lying within said cavity and rotatable on said seat and controlling the flow of oil through said port, and yielding means normally holding said valve member in position to close said port.

7. An oil bolt, comprising a bolt body having an oil reservoir, a rotatable valve controlling the flow of oil from said reservoir, and a spring strip connecting the valve and body and adapted to be twisted when the valve is rotated.

8. An oil bolt, comprising a bolt body having an oil reservoir, a rotatable valve controlling the flow of oil from said reservoir, and a spring strip connecting the valve and body and adapted to be twisted when the valve is rotated, said spring strip lying in said oil reservoir.

9. An oil bolt, comprising a bolt body having an oil reservoir and provided with filling and discharge ports, a valve rotatable in said body and controlling said ports, and supplemental means arranged to permit flow of air to said reservoir when the valve is opened.

10. An oil bolt, comprising a bolt body having an oil reservoir and a filling port in its wall, and a valve rotatable in said body and provided with portions adapted to open and close both ends of said port.

11. An oil bolt, comprising a bolt body having an oil reservoir and a filling port in its wall, a valve rotatable in said body and provided with portions adapted to open and close both ends of said port, and means for adjusting said valve longitudinally relative to the bolt body.

In testimony whereof I affix my signature.

RUDOLPH W. RAY.